United States Patent
Allen et al.

(10) Patent No.: US 9,697,057 B2
(45) Date of Patent: *Jul. 4, 2017

(54) AUTOMATED TRANSFER OF USER DATA BETWEEN APPLICATIONS UTILIZING DIFFERENT INTERACTION MODES

(71) Applicant: INTERNATIONAL BUSINESS MACHINES CORPORATION, Armonk, NY (US)

(72) Inventors: Corville O. Allen, Morrisville, NC (US); Robert E. Loredo, North Miami Beach, FL (US); Adrian X. Rodriguez, Durham, NC (US); Eric Woods, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,486

(22) Filed: Sep. 30, 2015

(65) Prior Publication Data

US 2016/0306685 A1    Oct. 20, 2016

Related U.S. Application Data

(63) Continuation of application No. 14/687,312, filed on Apr. 15, 2015.

(51) Int. Cl.
*G06F 9/54* (2006.01)
*G06F 17/28* (2006.01)
(Continued)

(52) U.S. Cl.
CPC .............. *G06F 9/543* (2013.01); *G06F 3/167* (2013.01); *G06F 9/546* (2013.01);
(Continued)

(58) Field of Classification Search
CPC .......... G06F 9/543; G06F 9/546; G06F 3/167; G06F 17/2785; G06F 17/28; G06F 17/30976; G06N 99/005
(Continued)

(56) References Cited

U.S. PATENT DOCUMENTS 7,983,411 B2   7/2011  Huet et al.
8,731,942 B2   5/2014  Cheyer et al.
(Continued)

OTHER PUBLICATIONS ifbyphone; SurVo NetGet; archived Nov. 15, 2010; 5 pages; https://web.archive.org/web/20101115090402/http://secure.ifbyphone.com/developers.php?a=netget.*
(Continued)

*Primary Examiner* — H S Sough
*Assistant Examiner* — Kimberly Jordan
(74) *Attorney, Agent, or Firm* — William H. Hartwell (57) ABSTRACT

Software that preserves information provided by a user in a first application utilizing a first interaction mode for use by a second application utilizing a second interaction mode, by performing the following steps: (i) generating a natural language log describing an interaction between a user and a first application, where the user interacts with the first application utilizing a first interaction mode; (ii) analyzing the natural language log using natural language processing to determine first user data; and (iii) utilizing the first user data by a second application, where the user interacts with the second application utilizing a second interaction mode different from the first interaction mode, and where the second application does not receive the first user data from the user via the second interaction mode.

5 Claims, 3 Drawing Sheets

(51) Int. Cl.
*G06F 3/16* (2006.01)
*G06N 99/00* (2010.01)
*G06F 17/27* (2006.01)
*G06F 17/30* (2006.01)

(52) U.S. Cl.
CPC .......... *G06F 17/2785* (2013.01); *G06F 17/28* (2013.01); *G06F 17/30976* (2013.01); *G06N 99/005* (2013.01)

(58) Field of Classification Search
USPC .......................................................... 719/313
See application file for complete search history.

(56) References Cited

U.S. PATENT DOCUMENTS

| | | | | |
|---|---|---|---|---|
| 2005/0213743 A1* | 9/2005 | Huet | ...................... | G06Q 10/10 379/265.09 |
| 2008/0033811 A1* | 2/2008 | Brown | ................... | G06Q 30/02 705/14.66 |
| 2008/0288349 A1* | 11/2008 | Weisberg | .......... | G06F 17/30899 705/14.54 |
| 2012/0077178 A1* | 3/2012 | Bagchi | .................... | G09B 7/00 434/362 |
| 2013/0275862 A1* | 10/2013 | Adra | ..................... | H04L 51/046 715/234 |
| 2013/0346886 A1 | 12/2013 | Cauchois et al. | | |
| 2014/0358612 A1* | 12/2014 | Sri | ................... | G06Q 10/06311 705/7.15 |
| 2015/0100381 A1* | 4/2015 | Petrie | ................ | G06Q 30/0203 705/7.32 |
| 2016/0034260 A1* | 2/2016 | Ristock | .................... | G06F 8/34 717/109 |

OTHER PUBLICATIONS

U.S. Appl. No. 14/687,312 Entitled "Automated Transfer of User Data Between Applications Utilizing Difference Interaction Modes", Filed on Apr. 15, 2015.
Appendix P.: List of IBM Patents or Patent Applications Treated As Related, Dated Oct. 1, 2015, 2 pages.

* cited by examiner

AUTOMATED TRANSFER OF USER DATA BETWEEN APPLICATIONS UTILIZING DIFFERENT INTERACTION MODES

BACKGROUND

The present invention relates generally to the field of human-computer interactions, and more particularly to user interactions with computer applications utilizing different interaction modes.

Human-computer interactions are, simply put, interactions between human beings and computers. Humans interact with computers in many ways (referred to herein as "interaction modes") including, for example, graphical user interfaces and voice user interfaces. Interactive voice response (IVR) is a known voice user interface that allows a computer to interact with humans through the use of voice and telephone-based DTMF (dual-tone multi-frequency signaling) tones. Natural language processing (NLP) is a known field concerned with the interactions between computers and human (natural) languages.

SUMMARY

According to an aspect of the present invention, there is a method, computer program product and/or system that performs the following steps (not necessarily in the following order): (i) generating a natural language log describing an interaction between a user and a first application, where the user interacts with the first application utilizing a first interaction mode; (ii) analyzing the natural language log using natural language processing to determine first user data; and (iii) utilizing the first user data by a second application, where the user interacts with the second application utilizing a second interaction mode different from the first interaction mode, and where the second application does not receive the first user data from the user via the second interaction mode.

DETAILED DESCRIPTION

Users of computer applications tend to interact with those applications in a wide variety of ways. As such, when switching between applications—especially applications utilizing different modes of interaction (or "interaction modes")—information can be lost in the process. Embodiments of the present invention preserve information provided by a user in a first application utilizing a first interaction mode for use by a second application utilizing a second interaction mode. Some embodiments do this by describing the user's interaction with the first application in natural language, and then using natural language processing (NLP) to convert the natural language into data that is useful by the second application. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
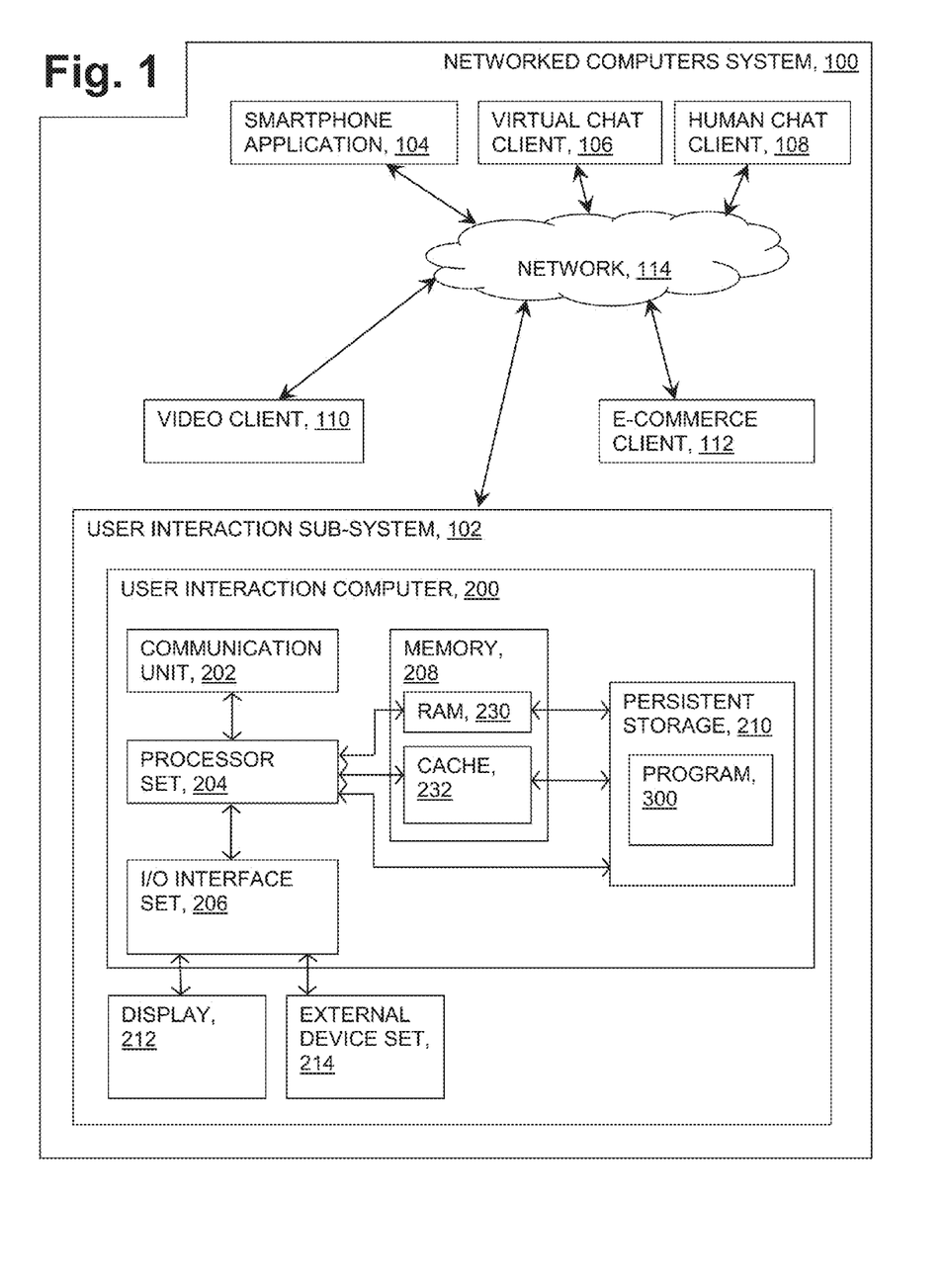
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: user interaction sub-system 102; smartphone application 104, virtual chat client 106, human chat client 108, video client 110, e-commerce client 112; communication network 114; user interaction computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smartphone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to sub-system 102. In these examples, communications unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smartphone display screen.

The programs described herein are identified based upon the application for which they are implemented in a specific embodiment according to the invention. However, it should be appreciated that any particular program nomenclature herein is used merely for convenience, and thus the invention should not be limited to use solely in any specific application identified and/or implied by such nomenclature.

The descriptions of the various embodiments according to the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
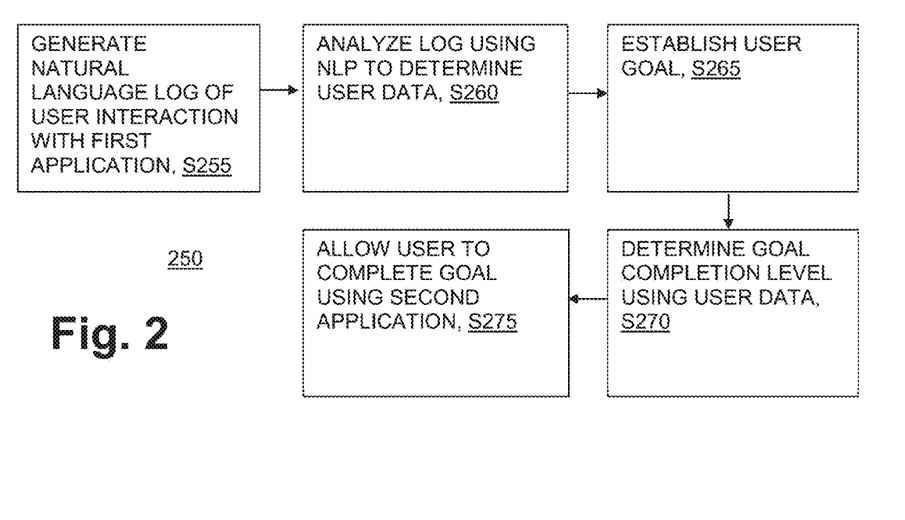
FIG. 2 is a flowchart showing a first embodiment method performed, at least in part, by the first embodiment system.
Figure 3:
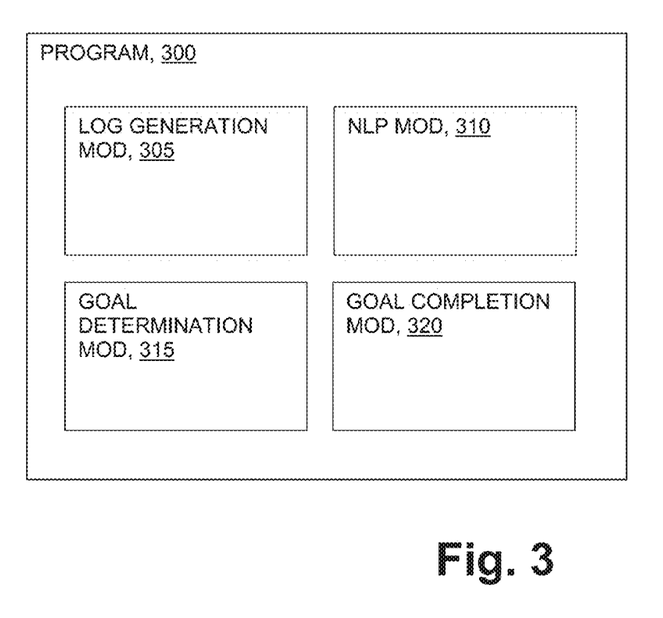
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, in relation to an example embodiment, with extensive reference to FIG. 2 (for the method step blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Processing begins at step S255, where log generation module ("mod") 305 generates a natural language log describing an interaction between a user and a first application, where the user interacts with the first application utilizing a first interaction mode. The natural language log includes natural language text, and as such is generally adapted to be analyzed by a natural language processor (such as natural language processing mod 310, which will be discussed in further detail, below). As used herein, "natural language" is simply any language used by human beings to communicate with each other (see the Definitions sub-section of this Detailed Description).

In many embodiments of the present invention, the generated natural language log includes natural language descriptions of user interactions (also referred to as "actions"), as opposed to (or in addition to) actual natural language statements made by the user. In fact, in some embodiments, the user does not make any natural language statements at all, and the natural language text included in the natural language log is simply text that has been generated by mod 305 for the purpose of describing the user's actions in the log. Stated another way, although the first interaction mode may, in some embodiments, be a typical mode of natural language interaction (such as, for example, a verbal or text-based interaction), in many embodiments the first interaction mode is one that does not typically involve natural language. For example, in the present embodiment, which will be discussed in more detail, below, the first interaction mode is the navigation by the user of a smartphone application. In other embodiments (such as embodiments discussed in the Further Comments and/or Embodiments sub-section of this Detailed Description), the first interaction mode includes performing actions on a website. However, these examples are not meant to be limiting, and the first interaction mode may include any known (or yet to be known) method for communicating information to the first application (for further discussion of interaction modes, see the Definitions sub-section of this Detailed Description).

Figure 4A:
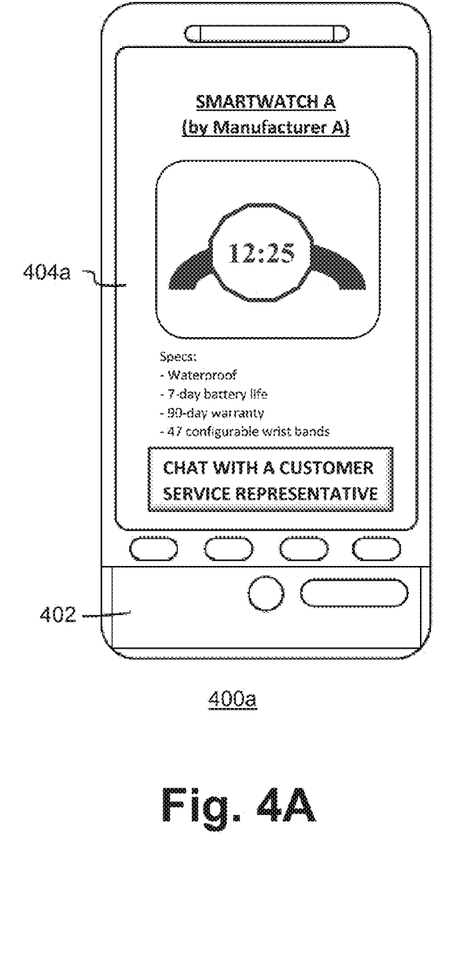
FIG. 4A is a screenshot view generated by the first embodiment system.

In the present example embodiment, the first application is a smartphone application (specifically, smartphone application 104, see FIG. 1) depicting a variety of consumer electronics products, including product details, reviews, articles, and discussion boards. The user in this embodiment, named "Thomas," is a follower and occasional purchaser of many of the products depicted in the first application. Thomas typically interacts with the first application by using a touchscreen display on his smartphone, which he uses to select products, scroll through information, watch videos, and generally learn more about the consumer electronics products. As such, the natural language log generated by step S255 includes statements such as the following: (i) "User selects article discussing wearable technology and reads the article in its entirety," (determined, for example, by the user scrolling to the bottom of the article and/or by tracking the user's eye movements), (ii) "User clicks on link to the product page for Smartwatch A," (iii) "User watches a video about Smartwatch A," (iv) "User selects a link to the product page for Smartwatch B," (v) "User returns to the product page for Smartwatch A and views its specifications," (vi) "User reads a review for Smartwatch A," and (vii) "User selects a button to 'Chat with a Customer Service Representative' about Smartwatch A." Screenshot view 400*a* (see FIG. 4A) shows screen 404*a* on Thomas' smartphone 402, depicting the product page for Smartwatch A in smartphone application 104.

Processing proceeds to step S260, where natural language processing (NLP) mod 310 analyzes the natural language log using natural language processing (see the Definitions sub-section of this Detailed Description) to determine first user data. The first user data includes any data obtained from the natural language log that may be useful in helping the user interact with a second application (such as virtual chat client 106, to be discussed in further detail, below). Some examples of first user data according to embodiments of the present invention include, but are not limited to: (i) biographical data about the user (such as the user's name, age, height, and eye color); (ii) data about the user's specific interactions with the first application (such as pages visited, links clicked, and forms completed); (iii) data about user interactions that are not limited to the user's specific interactions with the first application (such as types of computing devices that the user has used, and the types of social media accounts that the user uses to share information about the first application, and the types of media that that user typically consumes); (iv) data about the user's preferences (such as payment preferences, notification preferences, and communication mode preferences); and/or (v) data obtained via semantic analysis (such as the user's mood). In some embodiments, the first user data is also combined with data already known about the user from other sources. For example, in embodiments where the first application (or the second application) is a banking application, the first user data obtained from the logs may be combined with known information about the user's bank account. In other (or the same) embodiments, the first user data may be combined with data from the user's social media account(s) or other data pertaining to the user available on the World Wide Web. Furthermore, in some embodiments (including embodiments discussed in the following paragraph), the first user data may include entire programs, applications, or systems that are generated based on the natural language analysis performed by NLP mod 310.

In some embodiments according to the present invention (such as the present example embodiment, discussed below), the first user data includes a trained question answering (QA) system (not shown). Or, stated another way, in some embodiments, NLP mod 310 uses natural language processing to train a QA system with the natural language text contained in the natural language logs. In these embodiments, once trained, the first user data (that is, the QA system) can be used to answer questions from the viewpoint of the user. For example (and as will be discussed in further detail below), in some embodiments the second application is an application that asks questions of the user. In these embodiments, the QA system (that is, the first user data) can be used to automatically answer questions from the second application so that the user does not have to answer them himself/herself. In many of these embodiments, the QA system may be further trained to answer questions pertaining to the second application's specific domain, in order to better tailor the QA system for the task of answering questions asked by the second application. Furthermore, in other embodiments mod 310 may utilize other question answering methods and systems known (or yet to be known) in the art.

As stated above, in the present example embodiment, the first user data includes a question answering (QA) system trained using the natural language text from the natural language logs. More specifically, the QA system of the present embodiment has been trained to answer questions pertaining to the Thomas' application browsing history. Furthermore, the QA system has been provided with additional contextual information about Thomas, including his known payment preferences.

Processing proceeds to step S265, where goal determination mod 315 establishes a user goal for the user. A goal is an outcome that the user may achieve by using the first application (such as smartphone application 104) and the second application (such as virtual chat client 106). In some cases, the user goal is an outcome that the user intends to achieve. In other cases, the user goal is an outcome that the developer(s) (or administrator(s)) of the first application and/or the second application intend for the user to achieve. In still other cases, the user goal is an outcome intended by both the user and the developer(s) (or administrator(s)) of the first application and/or the second application. As such, many user goals are predefined and available for selection by mod 315 at the time of processing step S265. However, in some embodiments, additional user goals may be determined during the natural language processing of step S260. In many embodiments, the user goal (also referred to simply as the "goal") is achievable by performing a set of actions (sometimes referred to as a "pattern" of actions) where, in many cases, the user goal is ultimately achievable by performing some actions on the first application and the remaining actions on the second application. In many embodiments, the user goal is established based, at least in part, on the first user data. However, this is not always the case. In one embodiment, for example, the second application is a shopping cart application with an exclusive goal of selling a user an item. In this embodiment, the mere fact that the second application has been invoked is enough information to establish the user goal, and no analysis of the natural language logs or the first user data is necessary.

In the present example embodiment, goal determination mod 315 establishes a user goal of "sell Smartwatch A to user." In this embodiment, the second application is virtual chat client 106, which is an online chat client (or "chat robot") operated by the manufacturer of Smartwatch A. Chat client 106 is designed to help convert customer inquiries about Smartwatch A into purchases. As such, in this embodiment, based on the user's selection of the "Chat with a Customer Service Representative" button, which is an action in the set of actions for potentially completing the goal of "sell Smartwatch A to user" (in part, because it is an indicator that Thomas may be interested in purchasing Smartwatch A), goal determination mod 315 establishes the goal of "sell Smartwatch A to user."

Processing proceeds to step S270, where goal determination mod 315 determines a goal completion level based, at least in part, on the first user data. The goal completion level is, simply stated, the level to which the established goal has been completed (or "achieved"). In many embodiments, the goal completion level is determined by mapping the first user data to known actions in order to determine which actions for completing the user goal (sometimes referred to as "patterns" of actions) have been performed by the user. As with goals, many actions and patterns of actions for completing goals are predefined by system 100. However, this is not meant to be limiting, as in some cases the natural language processing of step S255 may help produce new potential actions and patterns of actions for completing goals. For a further discussion of actions, patterns of actions, and goals, as well as additional examples, see the Further Comments and/or Embodiments sub-section of this Detailed Description.

In the present example embodiment, as stated above, the established goal is to "sell Smartwatch A to user." Many combinations of actions are available to achieve this goal. Specifically, one set of actions that can be used to complete the goal is as follows: (i) user selects the "Chat with a Customer Service Representative" button; (ii) chat client 106 informs user of technical specifications of Smartwatch A; (iii) chat client 106 shows user a marketing video about Smartwatch A; (iv) chat client 106 asks the user for additional questions; and (v) chat client 106 asks the user if the user would like to purchase Smartwatch A. Based on this set of actions, the second application—that is, virtual chat client 106—prepares to ask Thomas questions in order to complete these actions. However, before this happens, program 300 intervenes to help answer these questions. As stated above, in this embodiment, the first user data is incorporated into a question answering (QA) system. As such, the QA system answers the initial questions asked by the chat client, such that goal determination mod 315 determines that actions (i), (ii), and (iii), above, have already been completed. Regarding action (i), goal determination mod 315 already knows that (i) has occurred by the fact that virtual chat client 106 has been called. For actions (ii) and (iii), goal determination mod 315 determines, based on the questions and their corresponding answers, that the user has already viewed the technical specification and video for Smartwatch A.

In the present example embodiment, chat client 106 operates automatically, utilizing a second interaction mode (text chat with a computer) that does not require any human intervention. In many embodiments, both the first application (such as smartphone application 104) and the second application (such as virtual chat client 106) operate in this manner, without the need for a human operator. However, this is not always the case. In some embodiments, either the first application or the second application, or both the first application and the second application utilize interaction modes that involve human-to-human contact. For example, in some embodiments, the second application is human chat client 108 or video client 110, where the user interacts with the second application via a human operator.

Processing proceeds to step S275, where goal completion mod 320 allows the user to complete the goal using the second application. More specifically, in this step, goal completion mod 320 allows the user (and in many cases, prompts the user) to perform the remaining actions of the set of actions required to complete the goal, using a second interaction mode that is different from the first interaction mode. The second interaction mode may be any known (or yet to be known) mode for interacting with the second application, including one or more of the interaction modes discussed above in relation to the first interaction mode (also, see the definition of "interaction mode" in the Definitions sub-section). Furthermore, as mentioned in the previous paragraph, the second interaction mode may or may not include human-to-human interaction, and in some embodiments (including the present example embodiment) the second interaction mode may be completely automated.

Figure 4B:
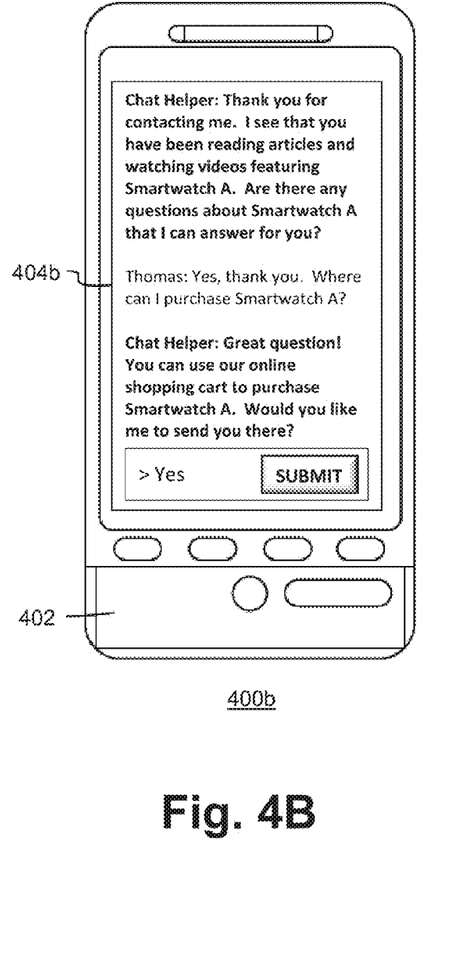
FIG. 4B is a screenshot view generated by the first embodiment system.

In the present example embodiment, goal completion mod 320 allows Thomas to complete the goal utilizing a second interaction mode (virtual chat) on virtual chat client 106. Screenshot view 400*b* (see FIG. 4B) shows a portion of this interaction on smartphone 402, where screen 404*b* depicts the interface provided by virtual chat client 106. More specifically, virtual chat client 106 first asks Thomas whether he has any additional questions. Thomas answers "Yes, thank you. Where can I purchase Smartwatch A?" Virtual chat client 106 responds by asking Thomas whether he would like to be sent to an online shopping cart to complete the purchase. Thomas answers "yes," and processing for method 250 completes. In this embodiment, virtual chat client 106 transfers Thomas to e-commerce client 112 (see FIG. 1), where Thomas completes his order of Smartwatch A. Here, as in other embodiments according to the present invention, program 300 is able to operate method 250 a second time, this time combining the first user data from the natural language logs from the first application with second user data from natural language logs from the second application, providing e-commerce client 112 with data helpful in expediting Thomas' order of Smartwatch A.

Finally, it should again be noted that the present example embodiment is used herein for example purposes, in order to help depict the scope of the present invention. However, other embodiments may be configured in different ways. For example, in some embodiments of the present invention, steps S265, S270, and S275 are combined into a single utilizing step, where program 300 utilizes the first user data by the second application for achieving a goal or some other purpose. In these embodiments, the user still interacts with the second application utilizing a second interaction mode different from the first interaction mode, and the second application does not receive the first user data from the user via the second interaction mode. For discussion of additional embodiments according to the present invention, see the following Further Comments and/or Embodiments sub-section of this Detailed Description.

III. Further Comments and/or Embodiments

Some embodiments of the present invention recognize the following facts, potential problems and/or potential areas for improvement with respect to the current state of the art: (i) switching from a mobile device to an audio customer service call causes a disruption in the flow of information; (ii) many customer service experiences involve repeating the same information multiple times; and/or (iii) typical customer service interactions require customers to explain already performed actions to a customer service representative.

Some embodiments of the present invention may include one, or more, of the following features, characteristics and/or advantages: (i) transmitting natural language logs of non-audio-based user activity to a system that will process the logs as if they were audio-based user questions; (ii) shifting a user goal from one medium (such as a mobile application) to a different medium (such as a web or desktop application); and/or (iii) transferring a human user between two mediums, where neither medium involves direct human-to-human interaction.

Embodiments of the present invention transmit natural language-based logs from a first system to a second system, to allow a user to continue performing an action (or complete a goal). In these embodiments, the second system parses the natural language-based logs from the first system, allowing the user's interactions with the first system (such as a mobile application) and the second system (such as an audio-based customer service system) to be seamless and continuous.

In some embodiments according to the present invention, a user continues and completes on the second system (such as the audio-based customer service system) a set of actions initially performed on the first system (such as the mobile application) without restarting from scratch, using the previously performed natural language-based actions to continue and complete a goal.

In an embodiment according to the present invention, an answer automation system logs actions performed by a user in a mobile application. The actions are then stored as natural language. Some examples of natural language action descriptions include, but are not limited to: (i) "The user logged in to the application using username 'USER'"; (ii) "The user checked his account balance"; and (iii) "The user attempted to make a transfer". Then, the user attempts to dial into a phone system. When this happens, the natural language logs are transmitted to the phone system and an NLP system parses the logs to route the user to the proper place in an interactive voice response (IVR) system. In some situations, if the answer automation system cannot determine where to route the user based on the logs, the system prompts the user to provide input to help determine a starting point, rather than having to start at the beginning.

In one embodiment of the present invention, a mobile application log includes the following entries: (i) "User logs in as bob123"; (ii) "User checks checking account"; (iii) "User looks at transaction history for one transaction"; (iv) "User clicks on 'late fee'"; and (v) "User calls customer service". When the user calls customer service, an IVR system begins asking questions which are correspondingly answered using the mobile application log (or "log"). The following paragraphs detail this interaction.

The IVR system generates a first question: "Can I have your account info?" After processing the log, the IVR system finds an answer: the user's username is "bob123," and the user's account number is "12345".

The IVR system then generates a second question: "Which account?" After processing the log, the IVR system finds an answer: the user's checking account.

The IVR system then generates a third question: "What can I help you with?" After processing the log, the IVR system finds an answer: the user has a question about a transaction.

The IVR system then generates a fourth question: "What can I help you with regarding this account?" After processing the log, the IVR system finds an answer: the late fee is being questioned by the user. Additionally, the IVR system retrieves the date and other transaction details surrounding the late fee.

The IVR system then generates a fifth question: "Would you like to dispute this charge?" After processing the log, the IVR system finds no answer to this question. As a result, the IVR system asks the user this question over the phone. The user hears the question and continues his conversation with the system. The user disputes the charge, the IVR system creates a ticket, and the customer ends the call. In the case of this example, the user himself only had to answer a couple of questions, with the system answering the first four questions directly from the logs without the help of the user.

In an embodiment of the present invention, all user actions on a mobile device application are logged in natural language on a server. Then the user chooses to continue via an automated customer service call, where an interaction ID associated with the user's natural language logs is used to connect the logs to the automated customer service call system. The system then analyzes the natural language logs to determine: (i) a goal that the user is attempting to accomplish (or a goal that the system would like the user to accomplish, based on the natural language logs); and (ii) how far towards the goal the user is. For example, in one embodiment, the system determines a goal of completing an instructional tutorial. In this example, the system analyzes the natural language logs to determine how many steps of the tutorial were completed on a mobile device in order to allow the user to complete the remaining steps on another device (such as a laptop).

Referring still to the same embodiment, after determining the goal, the system confirms the goal with the user. For example, in one situation, where the system is attempting to confirm a goal of "check transaction history," the system may say the following: "It appears that you were trying to check your transaction history. Confirm?" In another example, where the system attempts to confirm a goal of "display late fee," the system says, "It appears that you wanted to see a late fee during this period." Once the user confirms the goal, the system provides the information associated with the goal to the user. Using the example of displaying a late fee, the system may respond, "Your late fees for August were $30.00."

Some embodiments of the present invention analyze natural language logs of user activity using natural language processing, semantic analysis, and domain context. Some of these embodiments analyze sets of natural language statements to find a goal, identifying lexical attribute types, foci, and actions.

Some embodiments store actions in n-grams or relational mapping structures. For example, in one embodiment, the action of "Make Payment" could be stored in the following n-grams (where n equals four): "Going to make payment", "Going to pay account", "Going to pay bill", "Going to pay bills", "Need to make payment", and/or "Need to pay account." However, this is not meant to be limiting, and actions may be stored in n-grams of a wide variety of sizes and mapped in a wide variety of ways.

Some embodiments identify additional actions (that is, actions that were not previously known) in the logs based on the context of words used in the logs. For example, if a system according to the present invention identifies a verb word such as "check balance" on an application page entitled "checking accounts overview" in an application with a domain of "banking", the system may use this information to create a new action for "check balance."

Some embodiments of the present invention utilize a Question Answering (QA) system to automatically answer questions asked by the automated customer service call system. In these embodiments, the QA system is trained using the natural language logs of user activity. Additionally, in some embodiments the QA system is further trained using existing knowledge of goals and/or patterns used to achieve those goals.

In many embodiments according to the present invention, user goals are met by performing certain patterns of actions. In many cases, goals and their corresponding patterns of actions are pre-defined. However, in some embodiments, new patterns and goals are identified by analyzing the natural language logs of user activity, as well as other available sources. Embodiments according to the present invention compare the user's activity (from the natural language logs) to known actions, patterns, and goals to rank and/or rate the most likely goal for that particular user.

Once a system according to the present invention has identified a likely goal for a particular user, the system asks the user to confirm whether the goal is accurate. Once confirmed, the system performs any necessary steps to verify user authenticity, and then performs the steps to complete the goal, which, in many embodiments, results in a final "answer" that is provided to the user.

In some embodiments according to the present invention, natural language logs of user activity are used to direct a user to a customer service representative over a phone or web-based connection. In these embodiments, the customer service representative is provided with the user's initial information—provided by the natural language logs—in order to expedite the interaction and save time for both the user and the representative.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smartphones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Question Answering System: any computer system that answers questions posed in natural language.

Interaction Mode: any method by which human beings communicate with computers including, but not limited to: (i) input modes such as speech, handwriting, electronic typing, hand gestures, visual gazes, and interacting with a touch screen; (ii) output modes such as speech synthesis, the production of audible sounds, text on a screen, smart graphics, holographic projections, tactile simulations, and direct manipulation of the nervous system; and/or (iii) multimodal interactions that combine two or more input/output modes.

What is claimed is:

1. A method comprising:
generating, by one or more processors, a natural language log describing an interaction between a user and a first application, where the user interacts with the first application utilizing a first interaction mode;
analyzing, by one or more processors, the natural language log using natural language processing to determine first user data;
training, by one or more processors, a question answering system with the first user data; and
utilizing, by one or more processors, the trained question answering system to automatically answer a first set of question(s) on behalf of the user, thereby providing a first set of answer(s) to the first set of question(s), where the first set of question(s) is asked by a second application that interacts with the user utilizing a second interaction mode different from the first interaction mode, and where, as a result of the automatic answering of the first set of question(s), the second application asks a second set of question(s) different from the first set of question(s), and based on the first set of answer(s), for answering by the user utilizing the second interaction mode.

2. The method of claim 1, further comprising:
establishing a goal for the user, where the goal is achievable by performing a set of action(s); and
determining, based, at least in part, on the first user data, whether the user has achieved the goal by performing the set of action(s).

3. The method of claim 2, further comprising:
on condition that the goal has been determined to have not been achieved by the user, allowing, by one or more processors, the user to perform one or more remaining action(s) of the set of action(s) on the second application via the second interaction mode.

4. The method of claim 1, wherein:
the second interaction mode is audio and includes a voice response system; and
the second application is a customer service application.

5. The method of claim 4, wherein:
the first interaction mode is performing actions on a website; and
the first application is a web browser interacting with the website.

* * * * *